(12) United States Patent
Das et al.

(10) Patent No.: US 9,768,946 B2
(45) Date of Patent: Sep. 19, 2017

(54) FREQUENCY CORRECTION AND TIME SLOT BOUNDARY DETECTION

(71) Applicant: Telefonaktiebolaget L M Ericsson (publ), Stockholm (SE)

(72) Inventors: Sajal Kumar Das, Bangalore (IN); Balasubramanian Krishnamurthi, Bangalore (IN)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 225 days.

(21) Appl. No.: 14/432,745

(22) PCT Filed: Oct. 2, 2013

(86) PCT No.: PCT/EP2013/070523
§ 371 (c)(1),
(2) Date: Mar. 31, 2015

(87) PCT Pub. No.: WO2014/053532
PCT Pub. Date: Apr. 10, 2014

(65) Prior Publication Data
US 2015/0207614 A1    Jul. 23, 2015

Related U.S. Application Data

(60) Provisional application No. 61/711,276, filed on Oct. 9, 2012.

(30) Foreign Application Priority Data

Oct. 5, 2012 (EP) .................................. 12187431

(51) Int. Cl.
*H04L 7/00* (2006.01)
*H04L 5/00* (2006.01)
(Continued)

(52) U.S. Cl.
CPC ......... *H04L 7/0016* (2013.01); *H04B 7/2675* (2013.01); *H04L 5/0005* (2013.01); *H04W 56/00* (2013.01); *H04W 56/0035* (2013.01)

(58) Field of Classification Search
CPC .................... H04W 56/0035; H04B 7/2675
See application file for complete search history.

(56) References Cited

U.S. PATENT DOCUMENTS

2003/0231605 A1   12/2003 Amerga et al.
2005/0032542 A1*  2/2005 Wilborn ............ H04W 36/0088
                                                      455/525
(Continued)

FOREIGN PATENT DOCUMENTS

EP    1337041 A1    8/2003
JP    2007235493 A  9/2007

OTHER PUBLICATIONS

Author Unknown, Parallel monitoring of multiple frequencies and RATs, Doc. No. R4-081868, Aug. 22, 2008, pp. 1-13.*

(Continued)

*Primary Examiner* — Christopher Crutchfield
(74) *Attorney, Agent, or Firm* — Leffler Intellectual Property Law, PLLC

(57) ABSTRACT

There is provided a method for determining frequency correction and time slot boundary detection for synchronization in a wireless device. A plurality of cell broadcast frequencies is acquired. A subgroup of cell broadcast frequencies is determined from the received plurality of cell broadcast frequencies. Frequency and time slot information in the subgroup is recovered by tuning a local oscillator to a center frequency of the subgroup. Individual frequencies are extracted from the recovered frequency information. The individual frequencies are provided to a frequency correc- (Continued)

tion detector. A corresponding wireless device, computer program and computer program product are also provided.

16 Claims, 8 Drawing Sheets

(51) Int. Cl.
*H04W 56/00* (2009.01)
*H04B 7/26* (2006.01)

(56) References Cited

U.S. PATENT DOCUMENTS

| | | | |
|---|---|---|---|
| 2005/0079870 A1* | 4/2005 | Rick | H04W 60/04 455/437 |
| 2007/0070950 A1* | 3/2007 | Han | H04B 17/318 370/332 |
| 2008/0291892 A1 | 11/2008 | Luo | |
| 2012/0195282 A1* | 8/2012 | Choi | H04L 5/0048 370/329 |

OTHER PUBLICATIONS

PCT International Search Report, mailed Nov. 22, 2013, in connection with International Application No. PCT/EP2013/070523, all pages.
PCT Written Opinion, mailed Nov. 22, 2013, in connection with International Application No. PCT/EP2013/070523, all pages.
Nokia et al. "Parallel monitoring of multiple frequencies and RATs" 3GPP Draft R4-081868, RAN WG4, Aug. 14, 2008, XP050180384, pp. 1-11.
Nokia "Handover Principles and UE Capabilities" 3GPP Draft R2-051735, Jun. 15, 2005, XP050141844, pp. 1-9.
3GPP TS 45.002, V11.0.0 Technical Specification Group GSM/EDGE Radio Access Network; Multiplexing and multiple access on the radio path (Release 11), Aug. 2012, pp. 1-112.
Bill Mitchell, Variable Bandwidth RSSI Scanning, Motorola, Technical Developments, XP000638408, Aug. 1996, pp. 22-24.

* cited by examiner

FREQUENCY CORRECTION AND TIME SLOT BOUNDARY DETECTION

CROSS-REFERENCE TO RELATED APPLICATIONS

This application claims priority under 35 U.S.C. §119 to European Patent Application No. 12187431.7, filed Oct. 5, 2012, which is hereby incorporated herein by reference in its entirety. This application also claims the benefit of U.S. Provisional Application No. 61/711,276, filed Oct. 9, 2012, which is hereby incorporated herein by reference in its entirety.

TECHNICAL FIELD

Embodiments presented herein relate to frequency correction and time slot boundary detection for synchronization in a wireless device.

BACKGROUND

In mobile communication networks, there is always a challenge to obtain good performance and capacity for a given communications protocol, its parameters and the physical environment in which the mobile communication network is deployed.

Today's mobile communication devices support multiple radio access technologies (RAT) that comprises wideband code division multiple access (WCDMA), the long term evolution (LTE) telecommunications standard, the global system for mobile communications (GSM), a digital cross connected system (DCS), time division synchronous code division multiple access (TDSCDMA), and so on. In a multi-RAT (e.g., involving LTE/WCDMA/GSM) scenario, the mobile communication device may use an inter radio access technology (IRAT) cell search and measurement techniques in order to determine which cell to be operatively connected to as well as for making handover decision. In general, it may only be possible to make seamless intersystem handover with proper measurement of cell transmitted radio signals from different RATs by the mobile communication device.

In order to perform IRAT cell search and measurement, the network may create IRAT gaps in the transmitted data pattern to the mobile communication device. Thereby the mobile communication device may perform IRAT specific measurements and in order to synchronize with the cell from a specific RAT. In a so-called triple mode mobile communication device, where LTE, WCDMA and GSM RATs are available, operations such as generating the gaps, performing the measurements, and searching for the required information for synchronization are generally considered to be time crucial. Additionally, the mobile communication device may only have available a short period of time to perform these operations. In turn, the performance of the cell selection, reselection and handover depend on these operations.

Hence, there is a need for improved synchronization in wireless devices.

SUMMARY

An object of embodiments herein is to provide improved synchronization in wireless devices.

The inventors of the enclosed embodiments have through a combination of practical experimentation and theoretical derivation discovered that during, for example, GSM neighbour cell measurement, the wireless device needs to search the frequency correction channel (FCCH), which appears in a time multiplexed manner in the cell broadcast channel e.g. broadcast frequency and time slot number 0, for all detected strongest cell frequencies, for example based on the measured received signal strength indicator (RSSI), in the monitored cell list. When a large number of cells are present in the cell list, finding the FCCH for each of these cell frequency one after another can be a tedious process. One reason is that FCCH does not continuously appear in the broadcast frequency channels; rather it appears in a time multiplexed manner. This may be a severe issue in multi-RAT scenarios e.g. when the wireless device supports multiple RATs, because in such case the active RAT only provides a small time gap for performing the measurement and monitoring (e.g. to perform RSSI measurement and FCCH finding and synchronization channel (SCH) reading) for other neighbours cells. Hence, there is a need for making the FCCH search operation faster and resource optimized.

A particular object is therefore to provide improved synchronization by reducing the cell search time and synchronization time. According to a first aspect there is presented a method for determining frequency correction and time slot boundary detection for synchronization in a wireless device. The method is performed in the wireless device. The method comprises acquiring a plurality of cell broadcast frequencies. The method comprises determining a subgroup of cell broadcast frequencies from the received plurality of cell broadcast frequencies. The method comprises recovering frequency and time slot information in the subgroup by tuning a local oscillator to a center frequency of the subgroup. The method comprises extracting individual frequencies from the recovered frequency information. The method comprises providing the individual frequencies to a frequency correction detector.

Advantageously this enables the cell search time and synchronization time to be reduced using multi-mode device hardware already existing in the wireless device.

Advantageously, instead of searching for FCCH in different frequencies in a list one after another, this make the search process faster and optimized with respect to time, power consumption, resource need etc. Advantageously, this is especially very useful in multi-RAT scenarios.

Advantageously, by tuning the local oscillator to centre of frequency of several closely located cell (BCCH) frequencies this enables using parallel FCCH search mechanism from different neighbour cell (BCCH) frequencies.

Advantageously, the measurement gap time will thereby be utilized effectively and since this enables faster GSM search, the remaining time can be used for other RATs measurement or searching or synchronization. In turn, this may reduce the complexity for gap time handling and thereby resolve time critical issues.

Advantageously, since the search time is reduced also battery power (energy) may be saved.

Advantageously, since the FCCH for different frequencies is determined in parallel there will be no need to open the RF windows for long time for finding FCCH in different frequencies.

According to a second aspect there is presented a wireless device for determining frequency correction and synchronization in the wireless device. The wireless device comprises a receiver arranged to acquire a plurality of cell broadcast frequencies. The wireless device comprises a processing unit. The processing unit is arranged to determine a subgroup of cell broadcast frequencies from received plurality of cell broadcast frequencies. The processing unit is arranged to recover frequency and time slot information in the subgroup by tuning a local oscillator to a center frequency of the subgroup. The processing unit is arranged to extract individual frequencies from the recovered frequency information. The processing unit is arranged to provide the individual frequencies to a frequency correction detector.

According to a third aspect there is presented a computer program for determining frequency correction and synchronization in a wireless device, the computer program comprising computer program code which, when run on a wireless device causes the wireless device to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
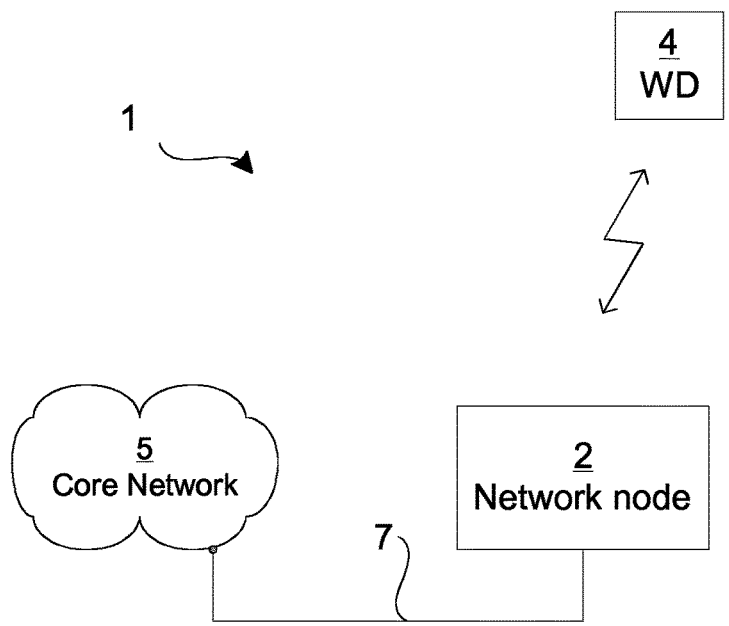
FIG. 1 is a schematic diagram illustrating a mobile communication network where embodiments presented herein may be applied.

FIG. 1 is a schematic diagram illustrating a mobile communication network 1 where embodiments presented herein can be applied. The mobile communication network 1 comprises a number of network nodes, one of which is illustrated at reference numeral 2 and a number of wireless devices (WD), one of which is illustrated at reference numeral 4. The wireless device 4 is enabled to access services provided by a core network 5 by being operatively connected to one of the network nodes 2. In turn the network nodes 2 are operatively connected to the core network 5 via an interface 7.

The mobile communication network 1 may be a multi radio access technology (multi-RAT) mobile communication network 1. Thus the wireless device 4 may be a multi-RAT wireless device 4. In multi-RAT wireless devices 4, the currently active RAT is denoted active RAT. When one RAT is active the remaining RATs are passive. The active RAT provides gaps for the wireless device 4 to perform measurements for all RATs supported by that wireless device 4, including the active RAT and any passive RATs. The number of available gaps for GSM measurement and cell search is limited; especially when there are a large number of cells from each RAT to be measured. Each RAT may have several cells which need to be monitored. In a GSM supported wireless device 4, the wireless device 4 should periodically monitor the strength of different neighbor GSM cells. In a broadcast control channel (BCCH) channel the BCCH Allocation (BA) List is transmitted to the wireless device 4 from the network nodes 2 for the wireless device 4 to monitor the neighboring cells, while operatively connected to a particular cell. This indicates to the wireless device 4 which neighbour frequencies (as determined by the absolute radio-frequency channel number, ARFCN) the wireless device 4 should monitor for cell search. In GSM every cell has a unique broadcast frequency (BCCH frequency) for transmitting multi-frame channel signalling. Thereby every neighbour cells have different broadcast frequencies which the wireless device 4 needs to monitor. In GSM several channels appear in a 51 multi-frame-structure in a predefined manner and repeats after every 51 frame. The signalling channel of a particular cell is only transmitted on the particular cell's broadcast frequency and at time slot number 0. Each time division multiple access (TDMA) frame consists of 8 slots and has a duration of 4.615 ms. The channels which appears in the 51 multi-frame structure comprise the frequency correction channel (FCCH), the synchronization channel (SCH), the BCCH and the common control channel (CCCH).

For measurement, monitoring and cell selection purpose, the wireless device 4 will monitor these neighbour frequencies (ARFCNs) for received signal strength (RSSI) measurement. Then wireless device 4 may then generate a list of ARFCNs whose RSSI is above a predetermined threshold value. Next, the wireless device 4 may search the FCCH (by using Frequency Correction Burst, FB) channel information in the selected ARFCNs (i.e. those ARFCNs whose RSSI is greater than the predetermined threshold value), preferably starting from the frequency with highest RSSI. This may be accomplished by a local oscillator in the radio frequency module of the wireless device 4 locking its frequency to these frequencies (ARFCN), whose RSSI level is higher than threshold, one after another according to the generated RSSI list. Once the FCCH has been found in a frequency, the wireless device 4 may search for the SCH channel (which contains Synchronization Burst, SB) in that frequency for decoding the base station identity code (BSIC) and for obtaining timing information (as the SCH channel contains BSIC and the Reduced Frame Number, RFN).

FCCH (FB) appears only on the 0th slot of the cell broadcast frequency of the 51 signaling multi-frame structure on the 0th, 10th, 20th, 30th, and 40th TDMA frames. This means that there is a time gap of around 10 frames between two FCCH on the same frequency (for the same cell). This time gap between appearance of FCCH is quiet large and "hitting" (i.e., coinciding with) the slot of the FCCH (FB) in an IRAT scenario where the time gap is provided by the active RAT for measurements is in general difficult and not always guaranteed. As a consequence thereof several iterations are typically required for searching even a single cell's (frequency) FCCH during the provided measurement gap. This leads to an inefficient and time and resource consuming mobile communication network.

If the RSSI level is more than a threshold level the wireless device 4 is arranged to monitor and search for FCCH and SCH channel information in those cell frequencies. Generally, the wireless device 4 is arranged to generate a cell list with descending order of measured RSSI level. The wireless device 4 is arranged to start searching the FCCH in those listed frequencies one after another in descending order of RSSI level. That is, the wireless device 4 is arranged to first process the cell frequency with highest RSSI measured and search for FCCH and then to process the next cell frequency whose RSSI level is the second next according to the descending order of RSSI strength.

As the number of the cell frequencies (neighbour cells) in the cell monitoring list increases (especially in multi-RAT scenarios or even in normal GSM scenarios), searching and finding FCCH in those listed frequencies, one after another may take a considerable time.

Once the RSSI is measured and found the cells whose RSSI is greater than a predetermined threshold and those cells which need to be monitored are listed. As a non-limiting example, assume that the cell frequency list is L={f1,f2,f3,f4,f5,f6}.

The FCCH channel uses frequency correction burst (FB) which carries all-zero bits, see 3GPP GERAN TS 45.002. Thus after Gaussian mean shift keying (GMSK) modulation (as used in GSM) the FCCH channel becomes a single frequency signal (single tone) with frequency 270.8333/4=67.77 KHz ($f_{FCCH}$=GSM symbol rate/4). This is RF up-converted and transmitted in the slot number 0 in the slot which belongs to the FCCH TDMA frame number in the 51 multi-frame structure as disclosed above. A FCCH detector is on the receiver side used to detect the FCCH. No demodulation or equalization takes place for the FCCH detection as shown in FIG. 3. FIG. 3 illustrates functional modules as implemented by the antennae 14, the receiver 10, and the processing unit 6 of the wireless device 4 of FIG. 2 according to an embodiment.

The receiver RF local oscillator (LO) is tuned to the required frequency (cell broadcast frequency e.g. BCCH frequency) to receive the FCCH burst data. However, it is not known to the receiver where the FCCH burst is located in the 51 multi-frame structure, see 3GPP TS 45.002. Therefore the RF window is opened for a long duration and in the back ground at the baseband the FB burst (frequency correction burst) is searched over the received I,Q data. Once the FCCH is found the RF window is closed and the information like-frequency error and timing information for finding the next SCH slot is derived.

The embodiments disclosed herein relate to improved frequency correction determination and time slot boundary detection for synchronization in a wireless device 4. In order to obtain improved frequency correction determination and time slot boundary detection for synchronization in the wireless device 4 there is provided a wireless device 4, a method performed in the wireless device 4, a computer program comprising code, for example in the form of a computer program product, that when run on the wireless device, causes the wireless device to perform the method.

Figure 2:
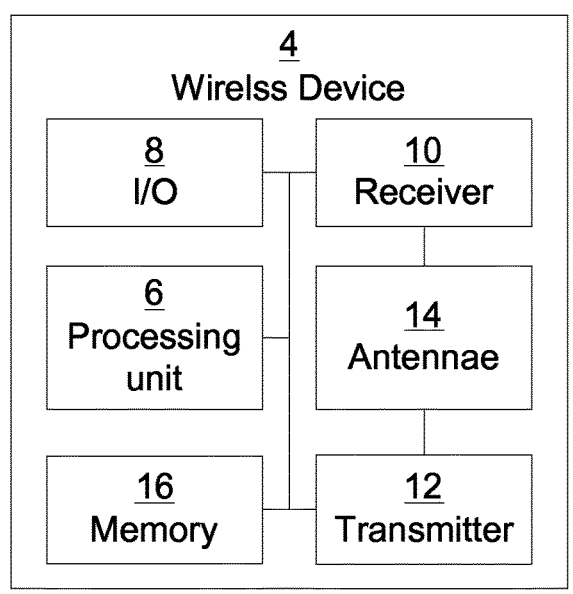
FIG. 2 is a schematic diagram showing functional modules of a wireless device.
Figure 3:
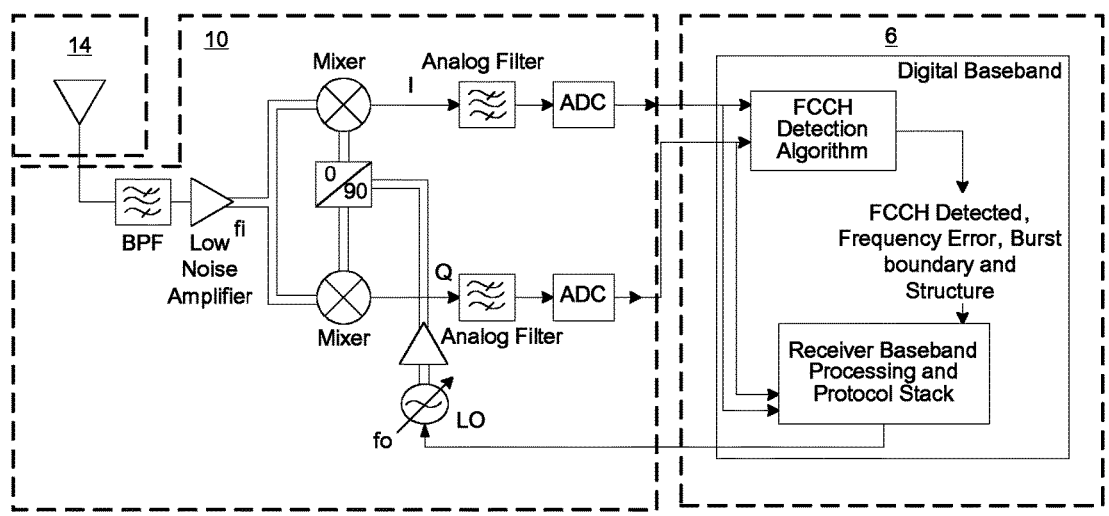
FIGS. 3-5 are schematic block diagrams for functional entities of the antennae, receiver and processing unit of a wireless device.

FIG. 2 schematically illustrates, in terms of a number of functional modules, the components of a wireless device 4. A processing unit 6 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 18 (as in FIG. 8), e.g. in the form of a memory 16. Thus the processing unit 6 is thereby arranged to execute methods as herein disclosed. The memory 16 may also comprise persistent storage, which, for example, can be any single one or combination of magnetic memory, optical memory, solid state memory or even remotely mounted memory. The wireless device 4 may further comprise an input/output (I/O) interface 8 for receiving and providing information to a user interface. The wireless device 4 also comprises one or more transmitters 12 and receivers 10, comprising analogue and digital components and a suitable number of antennae 14 for radio communication with the network node 2. The processing unit 6 controls the general operation of the wireless device 4, e.g. by sending control signals to the transmitter 12 and/or receiver 10 and receiving reports from the transmitter 12 and/or receiver 10 of its operation. Other components, as well as the related functionality, of the wireless device 4 are omitted in order not to obscure the concepts presented herein.

Figure 8:
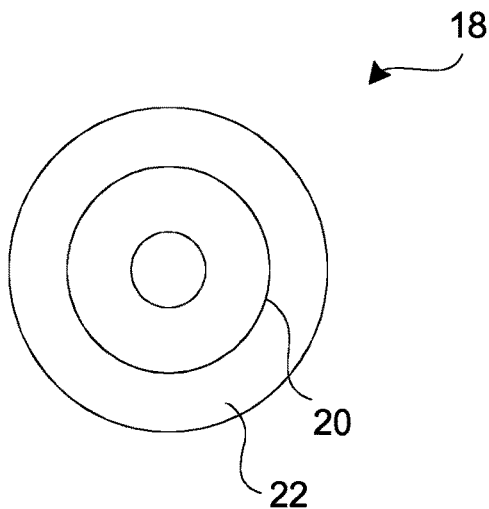
FIG. 8 shows one example of a computer program product comprising computer readable means.
Figure 9:
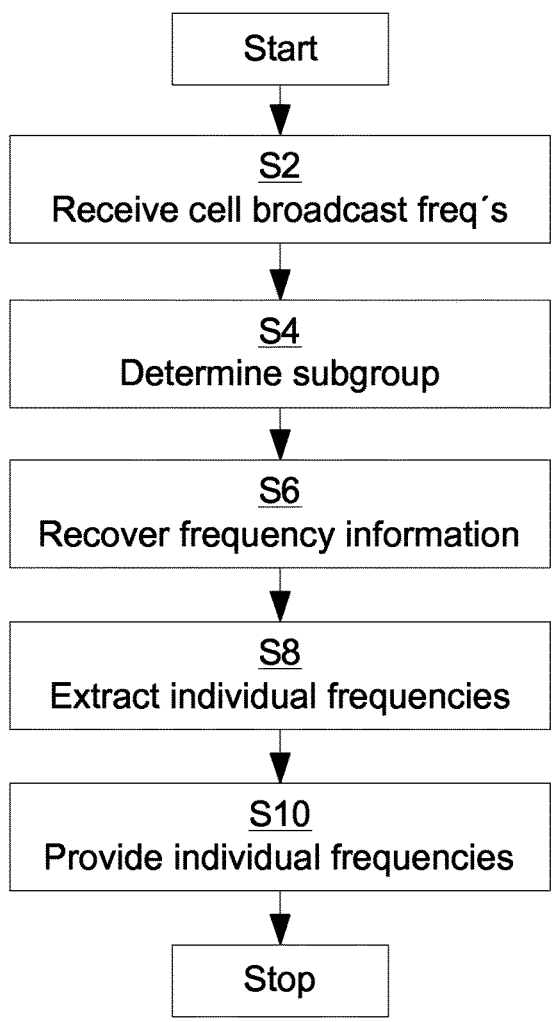
FIGS. 9 and 10 are flowcharts of methods according to embodiments.
Figure 10:
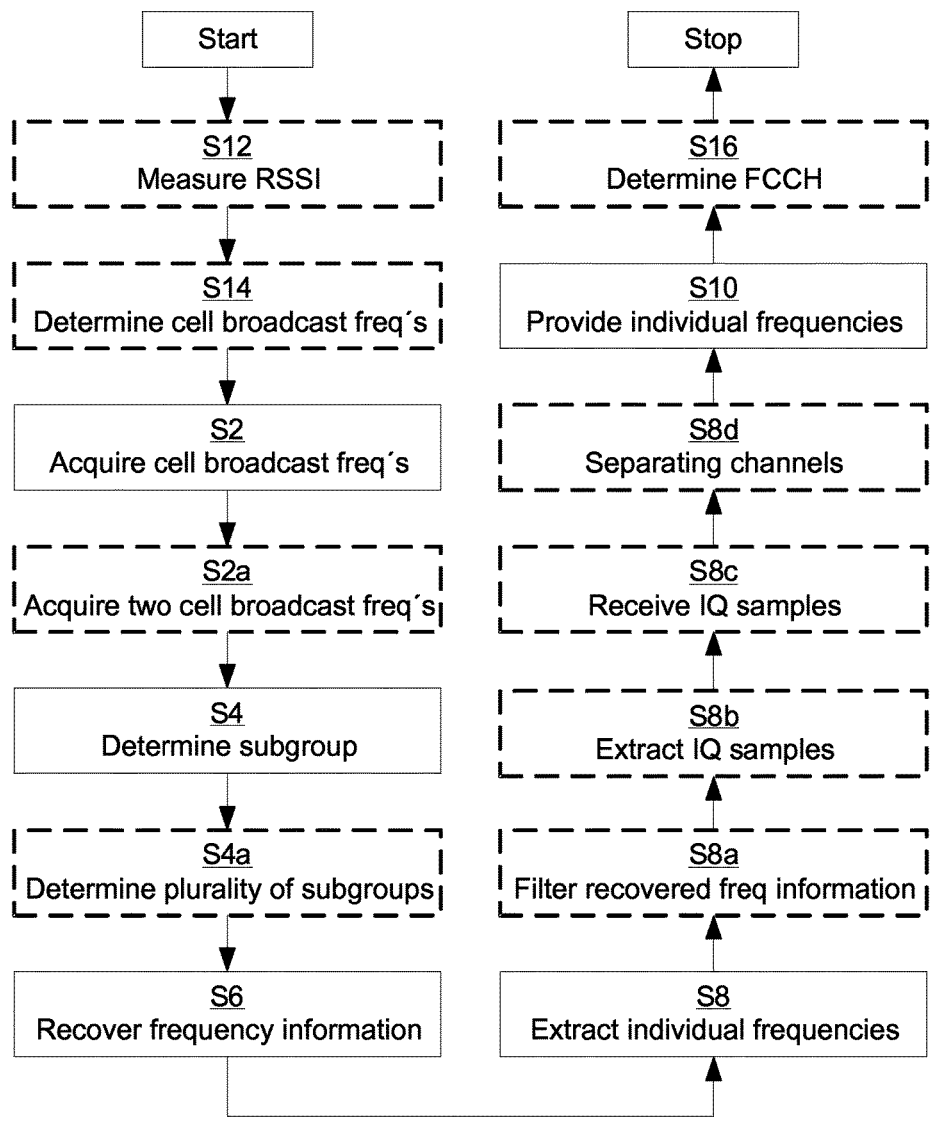

FIGS. 9 and 10 are flow charts illustrating embodiments of methods of for determining frequency correction and time slot boundary detection for synchronization in a wireless device. The methods are performed in the wireless device 4. The methods are advantageously provided as computer programs. FIG. 8 shows one example of a computer program product 18 comprising computer readable means 22. On this computer readable means 22, a computer program 20 can be stored, which computer program 20 can cause the processing unit 6 and thereto operatively coupled entities and devices, such as the memory 16, the I/O interface 8, the transmitter 12, the receiver 10 and/or the antennae 14 to execute methods according to embodiments described herein. In the example of FIG. 8, the computer program product 18 is illustrated as an optical disc, such as a CD (compact disc) or a DVD (digital versatile disc) or a Blu-Ray disc. The computer program product could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 20 is here schematically shown as a track on the depicted optical disk, the computer program 20 can be stored in any way which is suitable for the computer program product 18.

A method for determining frequency correction and time slot boundary detection for synchronization in a wireless device 4 will now be disclosed. In general terms, the wireless device 4 is arranged to measures RSSI for each neighbour cell, as indicated in the BA list sent by the network 1. Therefore, in a step S2 a plurality of cell broadcast frequencies is acquired by the wireless device 4. According to an embodiment the plurality of cell broadcast frequencies are received simultaneously. According to an embodiment, before the plurality of cell broadcast frequencies is acquired a received signal strength indication, RSSI for received absolute radio-frequency channel number, ARFCN, codes is measured, step S12. The plurality of cell broadcast frequencies may then be determined, in a step S14, according to the RSSI and the ARFCN codes.

Assume further that the frequency list L={f1,f2,f3,f4,f5,f6} is an ordered frequency list in term of measured RSSI value over these frequencies. Faster search may be achieved by determining one or more sub groups, where all frequencies are clustered together in terms of frequency values. Therefore, in a step S4 a subgroup of cell broadcast frequencies from the received plurality of cell broadcast frequencies is determined.

According to an embodiment the subgroup is determined so as to comprise only neighbouring frequencies of the received plurality of cell broadcast frequencies. For example, say that f1 and f3 are close by in frequency—say 900.2 and 900.6 MHz. Similarly, say that f2 and f4 are close by in frequency and that f5 and f6 are close by in frequency. In a step S4a a plurality of subgroups may be determined where each subgroup has its own center frequency. The local oscillator may then be tuned to each center frequency in turn. Three sub-list frequency groups, where each subgroup contains the frequencies which are close by in value may thus be determined for the present example. Thus, say, S1(f1,f3), S2(f2,f4), S3(f5,f6) are the three subgroups determined.

Figure 6:
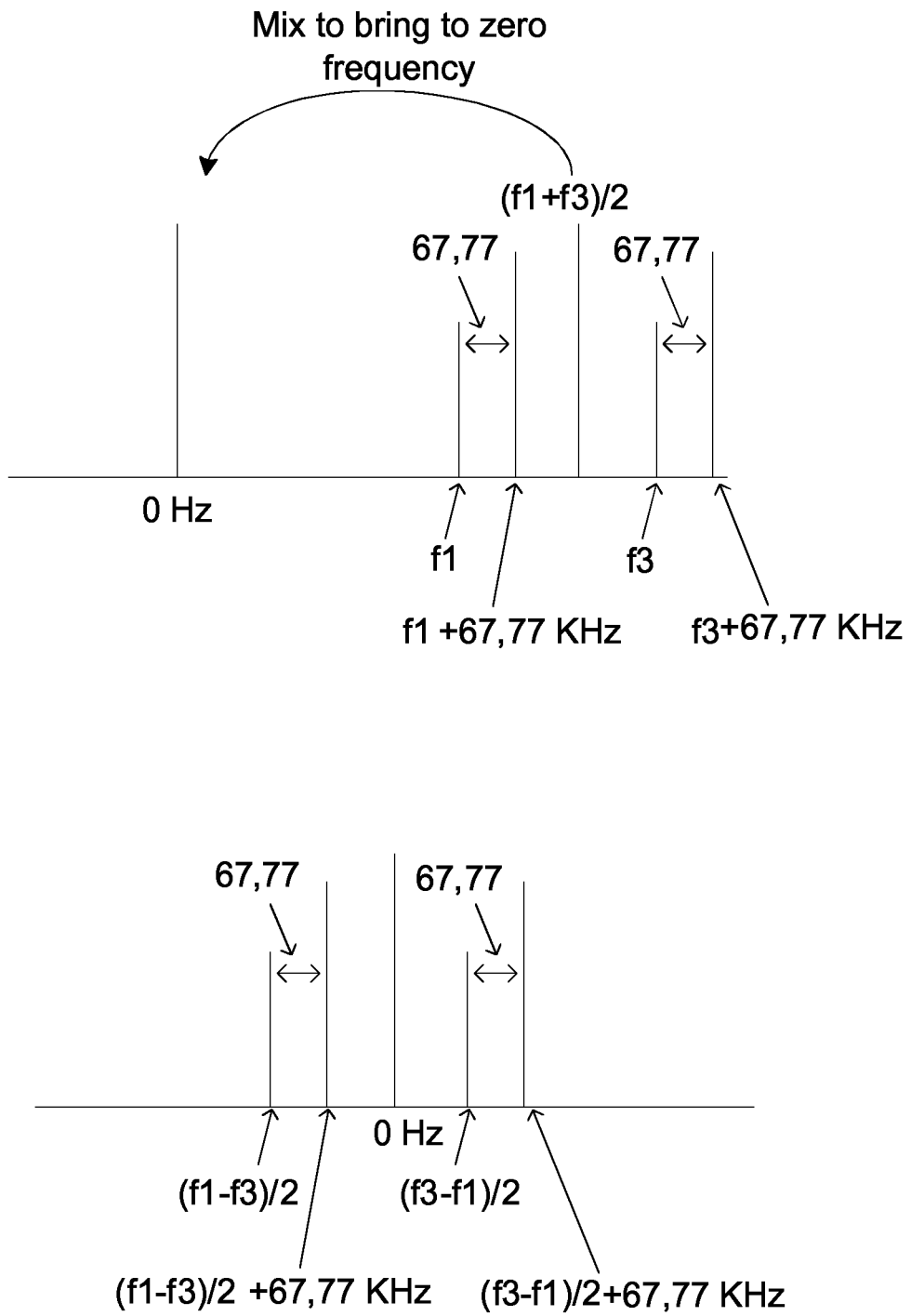
FIGS. 6-7 schematically illustrate frequency diagrams.

In a step S6 frequency and time slot information in a subgroup is recovered by the LO being tuned to a center frequency of the subgroup. As noted above this process may then be repeated for all subgroups. The LO frequency may be programmed to {(f1+f3)/2}. In general terms, according to an embodiment the center frequency is a mean value of frequency values in the subgroup. In FIG. 6 the top part depicts the incoming frequencies f1 and f3 and the corresponding FCCH signal frequency locations in those frequencies. The bottom part of FIG. 6 depicts the locations of FCCH frequencies after the mixing with the mid centre frequency (f1+f3)/2). The f1 component is the cell BCCH carrier frequency 1 and the f3 component is the cell BCCH carrier frequency 2. The FCCH channel tone frequency will be located at (fc+67.77 KHz) in the incoming received frequency, where fc is the carrier frequency.

Once the received frequency (fc+67.77 KHz) is down converted to baseband frequency by multiplying with the LO frequency fo, the resultant frequencies after mixing will be {(fc+67.77 KHz)+fo} and {(fc+67.77 KHz)−fo}. The contribution at {(fc+67.77 KHz)+fo} will be blocked by an analog RF filter whereas the frequency contribution at {(fc+67.77 KHz)−fo} will be passed via the analog filter. Generally, in a zero IF receiver the LO frequency is set to the same value as the incoming desired frequency (e.g. fo=fc) to receive the incoming desired signal frequency fc. So, fo-fc will be 0 (that means shifted to 0 Hz frequency or baseband). For example, when FCCH is present only the 67.77 KHz frequency signal will be present inside the baseband. Instead of programming the LO to fo frequency (which is equal to fc), the LO frequency is determined to {(f1+f3)/2}, that is, the centre of the two carrier frequencies f1 and f3. Thereby both the frequency carriers f1 and f3 of FCCH are received with a single FCCH estimation. The FCCH frequencies for f1 and f3 frequency after the multiplying will be located at frequency components (f1+f3)/2−(f1+67.77 KHz)=(f3−f1)/2+67.77 KHz and (f1+f3)/2−(f3+67.77 KHz)=(f1−f3)/2+67.77 KHz. This process is schematically illustrated in FIG. 6.

This mixed wideband signal may then be passed through the RF filters and after sampling by the ADC the I,Q samples may be passed to the baseband module to search for FCCH in the received I,Q samples. Thus, in a step S8a the recovered frequency information may be filtered. In a step S8b in-phase and quadrature, IQ, samples may be extracted by processing the filtered recovered frequency information by an analog-to-digital converter (ADC).

Generally, in a multimode and/or multi-RAT scenario the RF analog and digital filters used in the wireless device 4 allow to pass the wideband IF signal generated from the above mixing (because the ADC circuit is re-used among different RATs). The received buffer is thus passed to the digital baseband for FB searching. (if the filters are not wide enough, then in that case also, the analog filters (bandpass filters, BPF in FIGS. 3 and 4) may be adaptively programmed to expand their bandwidth when the wireless device 4 is using the RF for FCCH reception purposes).

Figure 7:
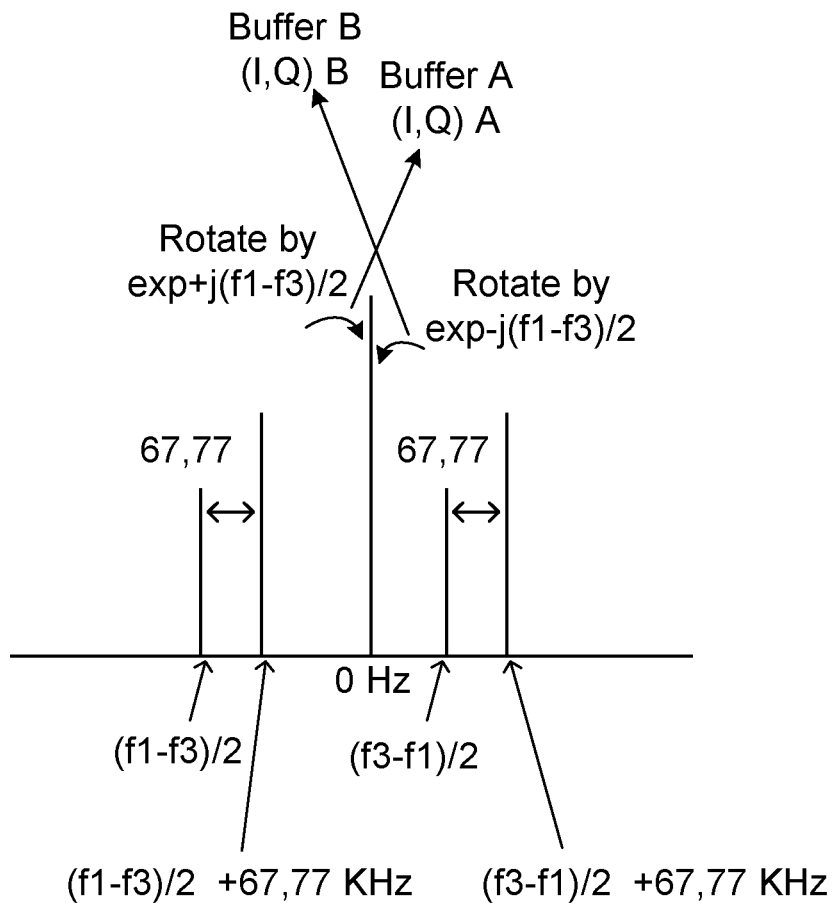

The received buffer are after down-conversion not centred at zero, The FCCH searching in f1 and f3 frequencies may be performed by de-rotating the received (I,Q) buffer and then use the existing FCCH search module to detect FCCH in the received samples. Extracting individual frequencies may thus according to an embodiment further comprises in a step S8c receiving the IQ samples at baseband and in a step S8d separating channels of the frequency information by de-rotating the IQ samples, thereby obtaining separate buffers for each individual frequency. The input I,Q signal may be rotated by an angle exp+j(f1−f3)/2 and an angle exp−j(f1−f3)/2 and two separate (I,Q) buffers may thus be formed for 'f1' FCCH monitoring and 'f3' FCCH monitoring, respectively. By rotating the received (I,Q) samples by exp+j(f1−f3)/2, the signal will shift to zero center frequency as shown in FIG. 7 illustrating how two buffer may be generated by rotating the I,Q signal by required amount to bring the respective centre frequency at zero for each carrier frequency for frequency f1. This created (I,Q) buffer, say (I,Q)', will be the same as if the LO was tuned to f1.

Figure 4:
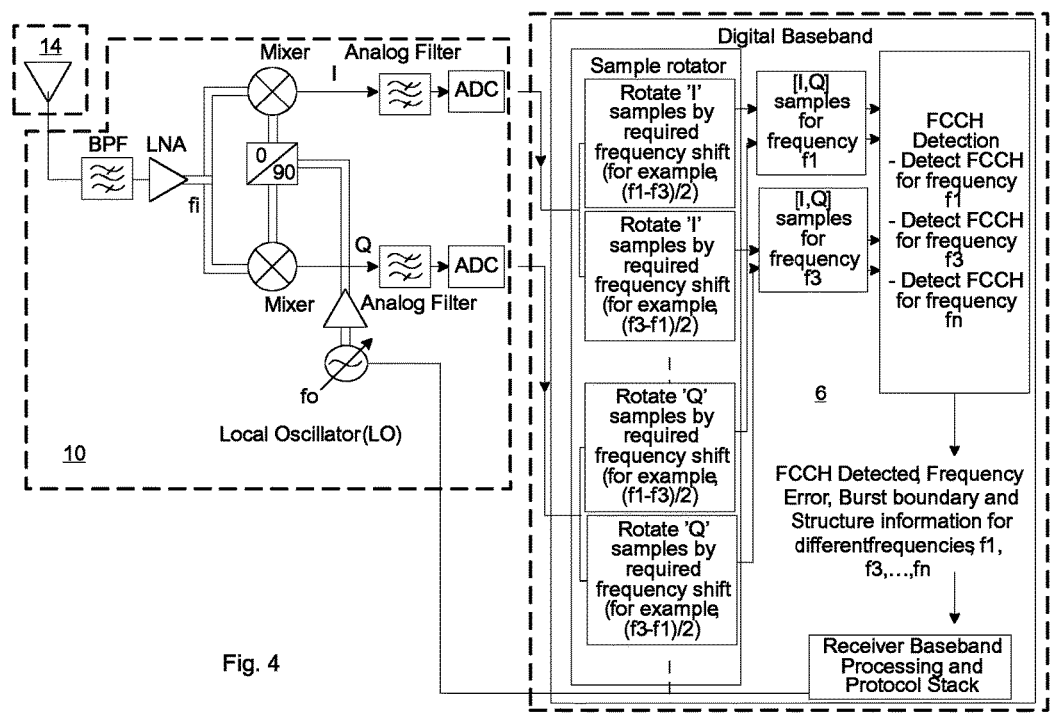

According to embodiments the frequency correction detector is a frequency correction channel, FCCH, detector. In a step S16 presence of FCCH in one of the individual frequencies may be detected (by the FCCH, detector). The buffer (I,Q)' may thus be used by the existing FCCH search algorithm for detecting the FCCH in frequency f1. Similarly the received buffer may be rotated by exp−j(f1−f3)/2 and the resultant buffer (I,Q)" thus corresponds to the LO being tuned to f3. This de-rotated buffer may be used by the existing FCCH search algorithm for detecting the FCCH in frequency f3. This is shown in FIG. 4. FIG. 4 illustrates functional modules as implemented by the antennae 14, the receiver 10, and the processing unit 6 of the wireless device 4 of FIG. 2 according to an embodiment. Functional blocks for rotating of the I and Q components as well as functional blocks for detecting the FCCH have in FIG. 4 been associated with the processing unit 6.

Thus the existing FCCH algorithm may be used for FCCH search for both the buffers e.g. for frequencies f1 and f3 separately, without requiring any modification of the existing FCCH detection module.

Thereby more than one FCCH may be searched simultaneously from more than one BCCH carrier frequencies. If each subgroup comprises more than two frequencies the LO may be be tuned to the center of each frequency in the subgroup in turn.

Further, the FCCH detector algorithm may take I,Q samples of the received frequency channel as input and provides as output:

(a) Information regarding FCCH is found in the received I,Q samples or not, (b) If found, information regarding the frequency error detected, and (c) if found information regarding where the FCCH (FB) data starts in the receive window, e.g. by indicating where the time slot starts e.g., by a time slot start position.

Having knowledge of the time slot start position, the wireless device 4 knows that in the next TDMA frame (e.g. after 8 time slots) it can expect the SCH (SB) channel information in the same frequency channel (as FCCH and SCH are time multiplexed in the cell broadcast frequency channel and appears at slot number 0 only). The time slot start position thus helps the wireless device 4 to know when to open the RF window for SCH reception. In this way the FCCH detection may be used to determine where the FCCH information starts so that the wireless device 4 may align with the time slot boundary. Thereby the FCCH may be used for synchronization purposes; in frequency as well as for time slot boundary determination.

In a multi-RAT wireless device 4, there are generally two RF receive paths; one for main reception and one for diversity receptions (an auxiliary RF Rx path). During the gap time when performing the measurement or FCCH/SCH search, the diversity RF path remains unused. However, the diversity RF RX path may be used for simultaneous reception of other frequencies.

Figure 5:
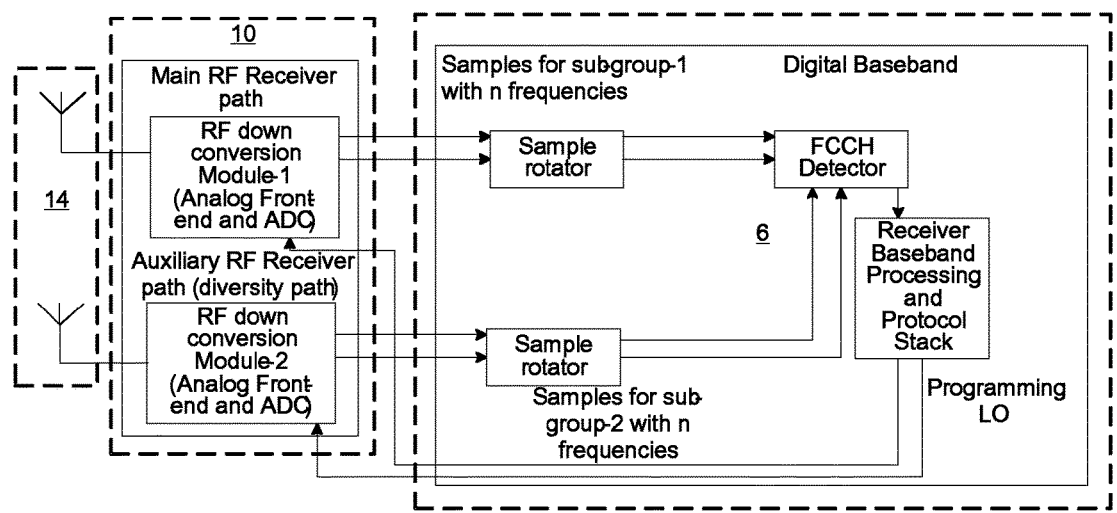

According to an embodiment, in a step S2a two occurrences of the plurality of cell broadcast frequencies is acquired in parallel. That is, the plurality of cell broadcast frequencies may be acquired by a main receiver as well as by an auxiliary receiver. At least one subgroup may then be determined for each one of the two occurrences of the plurality of cell broadcast frequencies That is, during the FCCH search for the List L, the main RF Rx may be set to (f1+f3)/2 and thus search for the FCCH from frequencies f1 and f3 and at the same time the diversity RF Rx path may be set to frequency (f2+f4)/2 and thus be used to search for FCCH for frequencies f2 and f4. This is shown in FIG. 5. FIG. 5 illustrates functional modules as implemented by the antennae 14, the receiver 10, and the processing unit 6 of the wireless device 4 of FIG. 2 according to an embodiment. The receiver block 10 comprises functional blocks for the main receiver path and the auxiliary receiver paths for simultaneous FCCH reception from different cell frequencies. Thereby, the FCCH for several BCCH frequencies (e.g. neighbour cells) may be found in efficient manner, thereby improving the cell search performance in multi-RAT scenarios.

In summary, there is provided methods and devices enabling fast cell synchronization, measurement and neighbour cell monitoring. Several cell broadcast frequencies may be simultaneously received and FCCH may be searched in those frequencies in parallel. The monitored cell frequencies in the cell list are grouped into several small subgroups, where each one of the subgroups contains frequencies which values are close. Then for each RF reception, a local oscillator is in turn tuned to the center frequency of each subgroup to receive all the frequencies in one subgroup in one RF window opening. The output signal may be filtered and digitized by an analog-to-digital converter and resulting I,Q samples may be passed to a baseband unit. At the baseband unit channel separation may be accomplished by de-rotating the I,Q samples by the required frequency amount as required based on the desired frequency position from 0 Hz. For each frequency a different amount of rotation is given and I,Q buffers are created for that frequency channel, where after de-rotation the center is located at 0 Hz. After this de-rotation several parallel channels will be created. The I,Q buffer for each channels will be fed to an existing FCCH detection algorithm in the wireless device to detect the presence of FCCH in that cell frequency. This enables fast FCCH search and will improve the measurement and monitoring process.

The invention has mainly been described above with reference to a few embodiments. However, as is readily appreciated by a person skilled in the art, other embodiments than the ones disclosed above are equally possible within the scope of the invention, as defined by the appended patent claims. For example, the herein disclosed subject matter may also be applied during an initial cell search process, i.e., in situations where the wireless device 4 is switched on and searches for a cell to be operatively connected to. By applying the herein disclosed subject matter the initial cell search process will be faster.

The invention claimed is:

1. A method for determining frequency correction and time slot boundary detection for synchronization in a wireless device, the method being performed in said wireless device, comprising:
   acquiring two occurrences of a plurality of cell broadcast frequencies in parallel;
   determining a subgroup of cell broadcast frequencies from said received plurality of cell broadcast frequencies, wherein at least one subgroup is determined for each one of said two occurrences of said plurality of cell broadcast frequencies;
   recovering frequency and time slot information in each said subgroup by tuning a local oscillator to a center frequency of each said subgroup;
   extracting individual frequencies from said recovered frequency information; and
   providing said individual frequencies to a frequency correction detector.

2. The method according to claim 1, wherein said plurality of cell broadcast frequencies are received simultaneously.

3. The method according to claim 1, wherein extracting individual frequencies comprises:
   filtering said recovered frequency information;
   extracting in-phase and quadrature (IQ) samples by processing said filtered recovered frequency information by an analog-to-digital converter;
   receiving said IQ samples at baseband; and
   separating channels of the frequency information by de-rotating said IQ samples, thereby obtaining separate buffers for each individual frequency.

4. The method according to claim 1, further comprising:
   measuring a received signal strength indication (RSSI) for received absolute radio-frequency channel number (ARFCN) codes; and
   determining said plurality of cell broadcast frequencies to be acquired according to said RSSI and said ARFCN codes.

5. The method according to claim 1, further comprising:
   determining a plurality of subgroups, each having its own center frequency, and wherein said local oscillator is tuned to each center frequency in turn.

6. The method according to claim 1, further comprising:
   detecting presence of FCCH in one of said individual frequencies.

7. The method of claim 1, wherein each said subgroup comprises a first cell broadcast control channel carrier frequency and a second cell broadcast control channel carrier frequency, each of which has a corresponding frequency correction channel signal frequency at a frequency offset of 67.77 KHz, and wherein the frequency and time slot information is further recovered by identifying at least one of said corresponding frequency correction channel.

8. A wireless device for determining frequency correction and synchronization in the wireless device, comprising:
  a main receiver arranged to acquire a plurality of cell broadcast frequencies;
  an auxiliary receiver arranged to acquire said plurality of cell broadcast frequencies; and
  a processing unit arranged to:
    determine a subgroup of cell broadcast frequencies from said plurality of cell broadcast frequencies received by said main receiver;
    determine a further subgroup of cell broadcast frequencies from said plurality of cell broadcast frequencies received by said auxiliary receiver;
    recover frequency and time slot information in each said subgroup by tuning a local oscillator to a center frequency of each said subgroup;
    extract individual frequencies from said recovered frequency information; and
    provide said individual frequencies to a frequency correction detector.

9. The wireless device according to claim 8, wherein said receiver is arranged to simultaneously receive said plurality of cell broadcast frequencies.

10. The wireless device according to claim 8, wherein said processing unit is arranged to extract individual frequencies by:
  filtering said recovered frequency information;
  extracting in-phase and quadrature (IQ) samples by processing said filtered recovered frequency information by an analog-to-digital converter;
  receiving said IQ samples at baseband; and
  separating channels of the frequency information by de-rotating said IQ samples, thereby obtaining separate buffers for each individual frequency.

11. The wireless device according to claim 8, wherein said processing unit is further arranged to:
  measure a received signal strength indication (RSSI) for received absolute radio-frequency channel number (ARFCN) codes; and
  determine said plurality of cell broadcast frequencies to be acquired according to said RSSI and said ARFCN codes.

12. The wireless device according to claim 8, wherein said processing unit is further arranged to:
  determine a plurality of subgroups, each having its own center frequency, and to tune said local oscillator to each center frequency in turn.

13. The wireless device according to claim 8, wherein said processing unit is further arranged to
  detect presence of FCCH in one of said individual frequencies.

14. The wireless device of claim 8, wherein each said subgroup comprises a first cell broadcast control channel carrier frequency and a second cell broadcast control channel carrier frequency, each of which has a corresponding frequency correction channel signal frequency at a frequency offset of 67.77 KHz, and wherein the frequency and time slot information is further recovered by identifying at least one of said corresponding frequency correction channel.

15. A nontransitory computer readable storage medium comprising a computer program for determining frequency correction and synchronization in a wireless device, the computer program comprising computer program code which, when run on the wireless device, causes the wireless device to:
  acquire two occurrences of a plurality of cell broadcast frequencies in parallel;
  determine a subgroup of cell broadcast frequencies from said received plurality of cell broadcast frequencies, wherein at least one subgroup is determined for each one of said two occurrences of said plurality of cell broadcast frequencies;
  recover frequency and time slot information in each said subgroup by tuning a local oscillator to a center frequency of each said subgroup;
  extract individual frequencies from said recovered frequency information; and
  provide said individual frequencies to a frequency correction detector.

16. The nontransitory computer readable storage medium according to claim 15, wherein each said subgroup comprises a first cell broadcast control channel carrier frequency and a second cell broadcast control channel carrier frequency, each of which has a corresponding frequency correction channel signal frequency at a frequency offset of 67.77 KHz, and wherein the frequency and time slot information is further recovered by identifying at least one of said corresponding frequency correction channel.

* * * * *